(12) United States Patent
Schwager (10) Patent No.: US 7,984,916 B2
(45) Date of Patent: Jul. 26, 2011

(54) THREE-WHEELED CART

(76) Inventor: Raymond A. Schwager, Sunland, CA (US)

( * ) Notice: Subject to any disclaimer, the term of this patent is extended or adjusted under 35 U.S.C. 154(b) by 346 days.

(21) Appl. No.: 12/351,722

(22) Filed: Jan. 9, 2009

(65) Prior Publication Data

US 2010/0102526 A1 Apr. 29, 2010

Related U.S. Application Data

(60) Provisional application No. 61/107,957, filed on Oct. 23, 2008.

(51) Int. Cl.
*B62B 1/00* (2006.01)

(52) U.S. Cl. ...................................................... 280/62

(58) Field of Classification Search ............... 280/47.24, 280/47.131, 47.29, 47.18, 43.14, 47.27, 652, 280/651, 37; 224/553; 242/557
See application file for complete search history.

(56) References Cited

U.S. PATENT DOCUMENTS

| | | | |
|---|---|---|---|
| D101,137 S | | 9/1936 | Penna |
| 2,477,294 A * | | 7/1949 | Fuller ............................ 414/448 |
| 2,650,834 A * | | 9/1953 | Coval ............................... 280/43 |
| D186,326 S | | 10/1959 | Palma |
| 3,064,990 A * | | 11/1962 | Salvucci ........................ 280/47.2 |
| 3,166,339 A * | | 1/1965 | Earley ............................ 280/654 |
| 3,774,930 A * | | 11/1973 | Pravednekow ............. 280/47.24 |
| 3,857,579 A * | | 12/1974 | Hoodenpyle ................ 280/47.2 |
| 3,881,216 A * | | 5/1975 | Fontana ........................ 16/35 R |
| 4,037,858 A * | | 7/1977 | Adams ........................... 280/652 |
| 4,261,596 A * | | 4/1981 | Douglas ........................ 280/652 |
| 4,348,034 A * | | 9/1982 | Welt ................................. 280/35 |
| D269,215 S | | 5/1983 | Caine |
| 4,538,393 A * | | 9/1985 | Mitchell ......................... 52/641 |
| D286,698 S * | | 11/1986 | Spicer ........................... D34/23 |
| 4,709,440 A * | | 12/1987 | Conelly ........................ 15/257.3 |
| D295,096 S | | 4/1988 | Smith |
| 4,738,581 A * | | 4/1988 | Kuhlman ...................... 414/462 |
| D309,517 S | | 7/1990 | Hawkins |

(Continued)

OTHER PUBLICATIONS

U.S. Appl. No. 29/328,746, filed Dec. 1, 2008, Raymond A. Schwager.

(Continued)

*Primary Examiner* — J. Allen Shriver, II
*Assistant Examiner* — James Triggs
(74) *Attorney, Agent, or Firm* — Knobbe Martens Olson & Bear, LLP (57) ABSTRACT

A three-wheeled cart includes a bottom portion with a base inclined downwardly toward a rear end of the cart, a pair of side walls attached to the base, the base and side walls defining a cavity therebetween. The bottom portion can have a pair of wedge-shaped fenders extending generally perpendicular to the side walls and a pair of axle mounts attached to the side walls and extending below the base, each side wall, fender and axle mount being integral with each other and part of a monolithic piece. A pair of front wheels is coupled via an axle to the axle mounts, the front wheels disposed below the fenders and inwardly therefrom. The cart can have a back portion attached to the bottom portion, the back portion having a back plate inclined rearwardly toward the rear end of the cart. A handle portion is attached to the side rails and has a support portion disposed rearwardly of the back plate. A rear wheel is operatively coupled to the bottom portion and disposed rearwardly of the bottom portion, the rear wheel configured to pivot about a vertical axis to facilitate the turning of the cart.

25 Claims, 6 Drawing Sheets

U.S. PATENT DOCUMENTS

| | | | |
|---|---|---|---|
| 5,263,727 A * | 11/1993 | Libit et al. | 280/40 |
| D343,039 S | 1/1994 | Knox | |
| 5,294,137 A * | 3/1994 | Barber et al. | 280/47.26 |
| 5,320,475 A * | 6/1994 | Pinder | 414/343 |
| D353,698 S | 12/1994 | Stevens et al. | |
| 5,390,942 A * | 2/1995 | Schuster et al. | 280/33.994 |
| 5,450,650 A * | 9/1995 | Bertrand et al. | 16/35 R |
| D379,016 S * | 4/1997 | Wilson | D34/24 |
| 5,658,118 A * | 8/1997 | Luca | 414/444 |
| 5,779,251 A * | 7/1998 | Meier | 280/47.2 |
| 5,913,527 A * | 6/1999 | Hailston | 280/47.28 |
| 5,947,491 A * | 9/1999 | Meier | 280/47.2 |
| 5,983,614 A * | 11/1999 | Hancock et al. | 56/16.7 |
| D438,682 S | 3/2001 | Furuta et al. | |
| 6,220,611 B1 * | 4/2001 | Shapiro | 280/47.34 |
| 6,273,438 B1 * | 8/2001 | Prapavat | 280/47.21 |
| D462,493 S | 9/2002 | Sivells et al. | |
| 6,595,398 B2 * | 7/2003 | Himel, Jr. | 224/495 |
| 7,080,851 B2 * | 7/2006 | Schipper | 280/651 |
| 7,168,712 B2 * | 1/2007 | Celli | 280/47.18 |
| 7,210,545 B1 * | 5/2007 | Waid | 180/65.1 |
| 7,341,417 B1 * | 3/2008 | Lohr | 414/462 |
| 7,367,570 B1 * | 5/2008 | Marsh | 280/32.6 |
| 7,431,314 B2 * | 10/2008 | Donaldson | 280/47.27 |
| 7,641,206 B2 * | 1/2010 | Knoebel | 280/47.34 |
| 2005/0258007 A1 * | 11/2005 | Albert | 188/2 D |
| 2007/0261905 A1 * | 11/2007 | Lin | 180/213 |
| 2008/0203687 A1 * | 8/2008 | Meyers et al. | 280/47.18 |

OTHER PUBLICATIONS

U.S. Appl. No. 12/389,285, filed Feb. 19, 2009, Raymond A. Schwager.

* cited by examiner

THREE-WHEELED CART

CROSS-REFERENCE TO RELATED APPLICATIONS

This application claims priority to U.S. Provisional Patent Application No. 61/107,957, filed on Oct. 23, 2008, the entire contents of which are incorporated herein by reference and should be considered a part of this specification.

BACKGROUND OF THE INVENTION

1. Field of the Invention

The present invention relates to a cart, and more specifically to a three-wheeled cart.

2. Description of the Related Art

Four wheel carts are generally known. However, these carts are generally hard to turn or require complicated mechanisms to turn the wheels. Additionally, many conventional carts have a relatively small load weight limit and become unstable depending on how much load is added to the cart, as well as where the load is placed on the cart.

SUMMARY OF THE INVENTION

There is a need for a three-wheeled cart, optionally one that is easy to manufacture and has high strength and rigidity, and that can carry a heavy load (e.g., on the order of about 1000 lbs although the cart may be configured to receive greater or lesser loads) and allow a user to easily operate the cart while providing safety features for the user while pushing the cart.

In accordance with one embodiment, a three-wheeled cart is provided comprising a bottom portion configured to support a load thereon, the bottom portion comprising a base inclined downwardly toward a rear end of the cart, a pair of side walls attached to the base, the base and side walls defining a cavity therebetween, the bottom portion further comprising a pair of fenders extending generally perpendicular to the side walls and a pair of axle mounts extending below the base. The three-wheeled cart also comprises a pair of front wheels coupled to each other via an axle rotatably mounted on the axle mounts, the front wheels disposed below the fenders and inwardly therefrom, and a positive cam brake coupled to the bottom portion, the cam brake mechanically actuatable to engage one of the pair of front wheels to lock said wheel. The three-wheeled cart also comprises a back portion attached to the bottom portion, the back portion comprising a back plate inclined rearwardly toward the rear end of the cart to maintain the stability of the cart during use irrespective of a load amount disposed in or on the cart, the back portion further comprising a pair of side rails attached to the back plate. A c-shaped handle portion is attached to the side rails and having a support portion disposed rearward of the back plate, the support portion configured to support a user's hands while pushing the cart while protecting the user's hands from colliding with an object that comes in contact with a side of the cart during use. A rear wheel is operatively coupled to the bottom portion and disposed rearwardly of the side walls of the bottom portion, the rear wheel configured to pivot about a vertical axis to facilitate the turning of the cart.

In accordance with another embodiment, a three-wheeled cart is provided comprising a bottom portion comprising a base inclined downwardly toward a rear end of the cart, a pair of side walls attached to the base, the base and side walls defining a cavity therebetween, the bottom portion further comprising a pair of wedge-shaped fenders extending generally perpendicular to the side walls and a pair of axle mounts attached to the side walls and extending below the base, each side wall, fender and axle mount being integral with each other and part of a monolithic piece. The three-wheeled cart also comprises a pair of front wheels coupled via an axle rotatably mounted to the axle mounts, the front wheels disposed below the fenders and inwardly therefrom. A mechanical brake is coupled to the bottom portion, the brake actuatable to engage one of the front wheels to inhibit rotation of said wheel. A back portion is attached to the bottom portion, the back portion comprising a back plate inclined rearwardly toward the rear end of the cart to maintain the stability of the cart during use irrespective of a load amount carried by the cart. A handle portion is attached to the side rails and having a support portion disposed rearwardly of the back plate, the support portion configured to support a user's hands during operation of the cart while protecting the user's hands from colliding with an object that comes in contact with a side of the cart during use. A rear wheel is operatively coupled to the bottom portion and disposed rearwardly of the bottom portion, the rear wheel configured to pivot about a vertical axis to facilitate the turning of the cart.

In accordance with still another embodiment, a three-wheeled cart is provided. The cart comprises a bottom portion comprising a base inclined downwardly toward a rear end of the cart, a pair of side walls attached to the base, the base and side walls defining a cavity therebetween. The bottom portion further comprises a pair of fenders extending outwardly from the side walls and a pair of axle mounts attached to the side walls and extending below the base, each side wall, fender and axle mount being integral with each other. The cart also comprises axle mounts configured to receive a pair of front wheels coupled via an axle rotatably mounted to the axle mounts to thereby position the front wheels below the fenders and inwardly therefrom. A mechanical brake is coupled to the bottom portion, the brake actuatable to engage at least one of the front wheels to inhibit rotation of said wheel. A back portion is attached to the bottom portion, the back portion comprising a back plate inclined rearwardly toward the rear end of the cart to maintain the stability of the cart during use. The cart also comprises handle portion attached to the side rails and having a support portion disposed rearwardly of the back plate, the support portion configured to support a user's hands during operation of the cart while protecting the user's hands from colliding with an object that comes in contact with a side of the cart during use. A mount is configured to operatively couple a rear wheel to the bottom portion and to position the rear wheel rearwardly of the bottom portion, the rear wheel configured to pivot about a substantially vertical axis to facilitate the turning of the cart

DETAILED DESCRIPTION OF PREFERRED EMBODIMENTS

FIGS. 1-7 show one embodiment of a three-wheeled (TW) cart 1000. The TW cart 1000 can include a bottom portion 10 with a base 12, a pair of side walls 14 attached to opposite sides of the base 12 so as to define a cavity 13 therebetween, and a pair of fenders 16 attached to the side walls 14. The bottom portion 10 of the TW cart 1000 can also have a front lip 18 extending from the base 12 at a front end 2 of the TW cart 1000.

Figure 1:
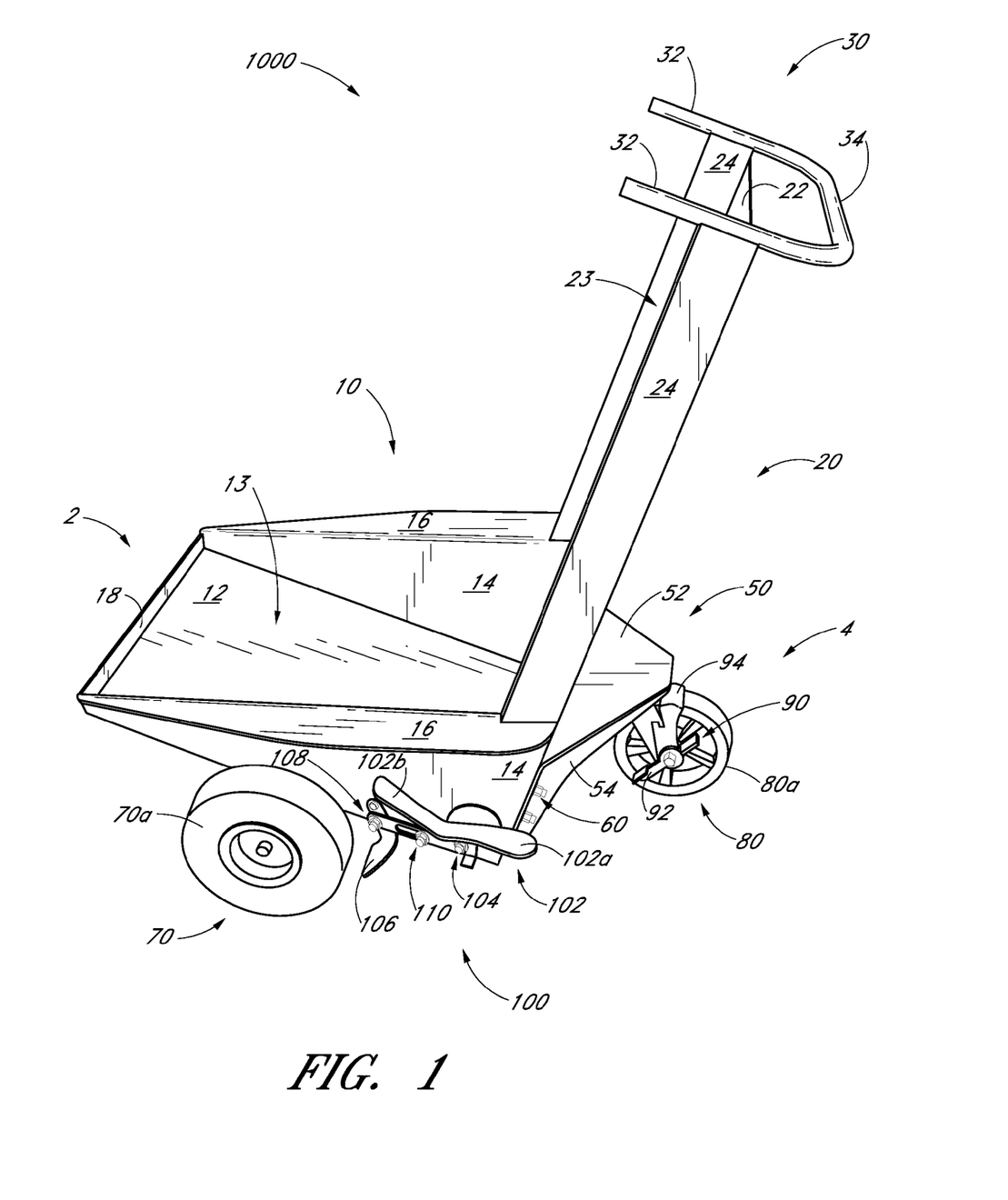
FIG. 1 is a schematic perspective view of one embodiment of a three-wheeled cart.
Figure 2:
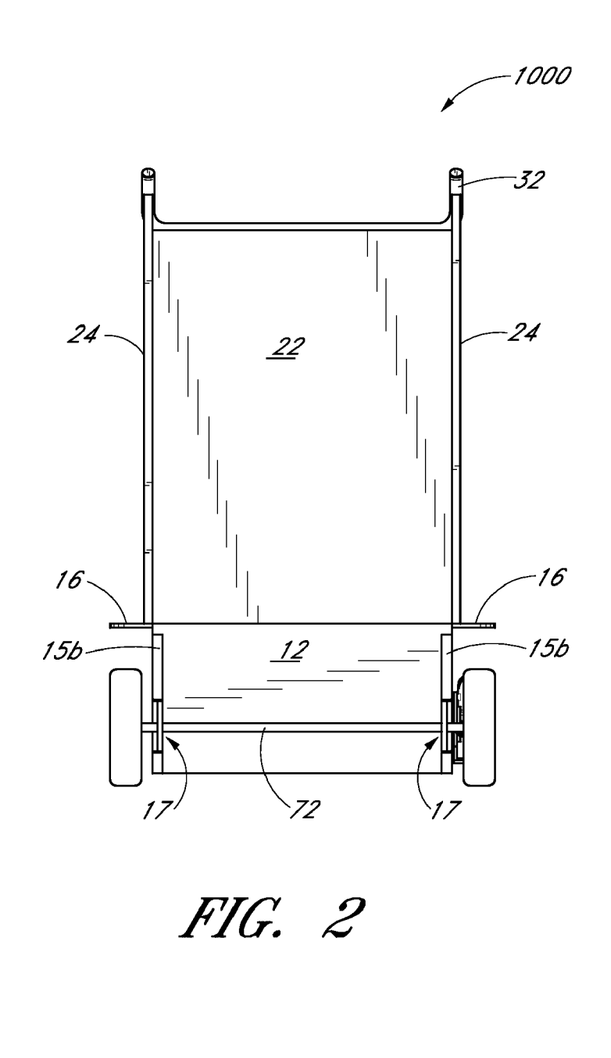
FIG. 2 is a schematic front view of the three-wheeled cart of FIG. 1.
Figure 3:
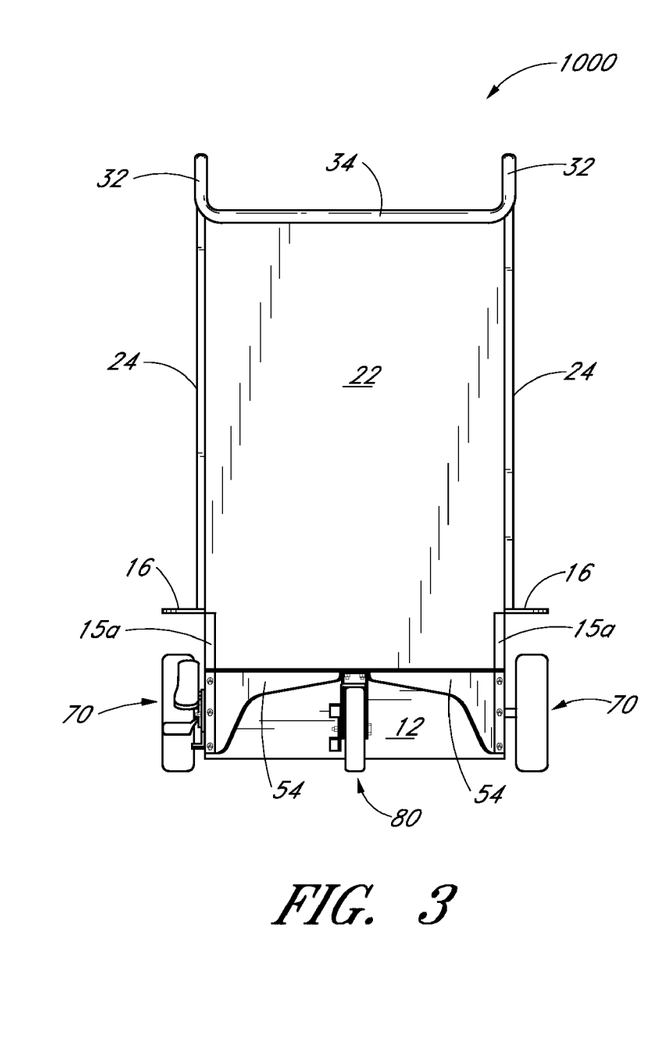
FIG. 3 is a schematic rear view of the three-wheeled cart of FIG. 1.
Figure 4:
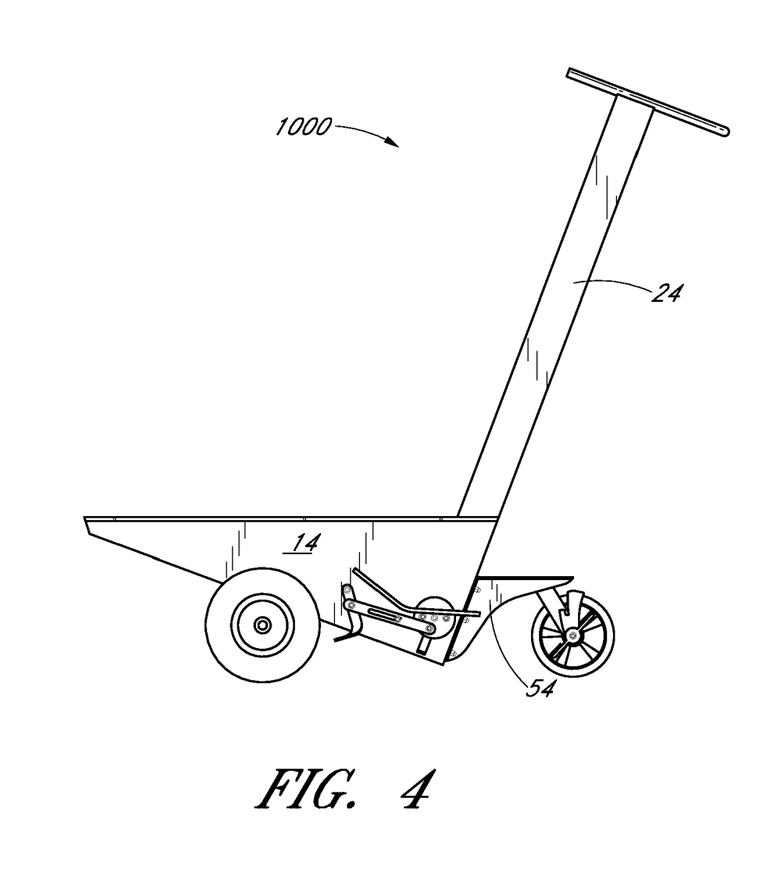
FIG. 4 is a schematic left side view of the three-wheeled cart of FIG. 1.
Figure 4A:
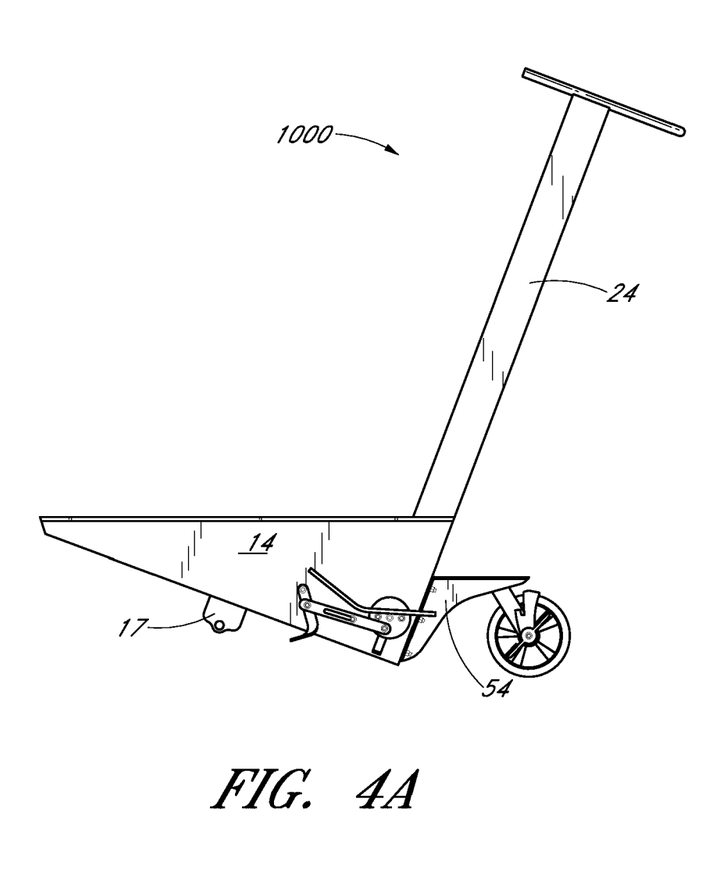
FIG. 4A is a schematic left side view of the three-wheeled cart of FIG. 1 with the front wheels removed.
Figure 5:
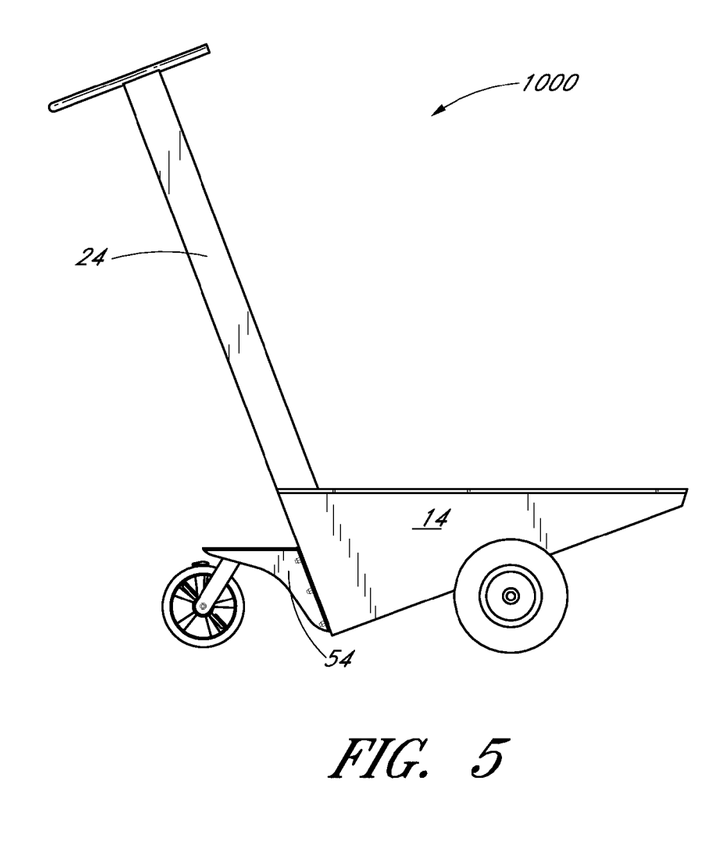
FIG. 5 is a schematic right view of the three-wheeled cart of FIG. 1.

In the illustrated embodiment, as best shown in FIGS. 1 and 4, the base 12 is inclined downwardly toward a rear end 4 of the TW cart 1000. In one embodiment, the base 12 can be a plate that is planar. In another embodiment, the base 12 can have a concave shape. However, the base 12 can have other suitable shapes.

The cart 1000, including cavity 13, can be sized to accommodate reels of heavy cables, such as those used at movie and television studio sets to connect power and/or controls lighting, special effects, cameras, and other equipment. The cables can be between 50 and 100 feet in length and 3/16 inch and 3/4 inch in diameter, though the cables can have other lengths and diameters. In some embodiments, the reels and cables can be disposed in crates (e.g., "milk crates" as known in the movie and television industries) that are then carried by the cart 1000. Similarly, the height of the side walls 14 are optionally selected to accommodate the height of such reels of cables (whether or not the cables are on a spindle). Such reels can weigh up to 1000 pounds or more and thus are difficult to move using conventional carts.

Figure 6:
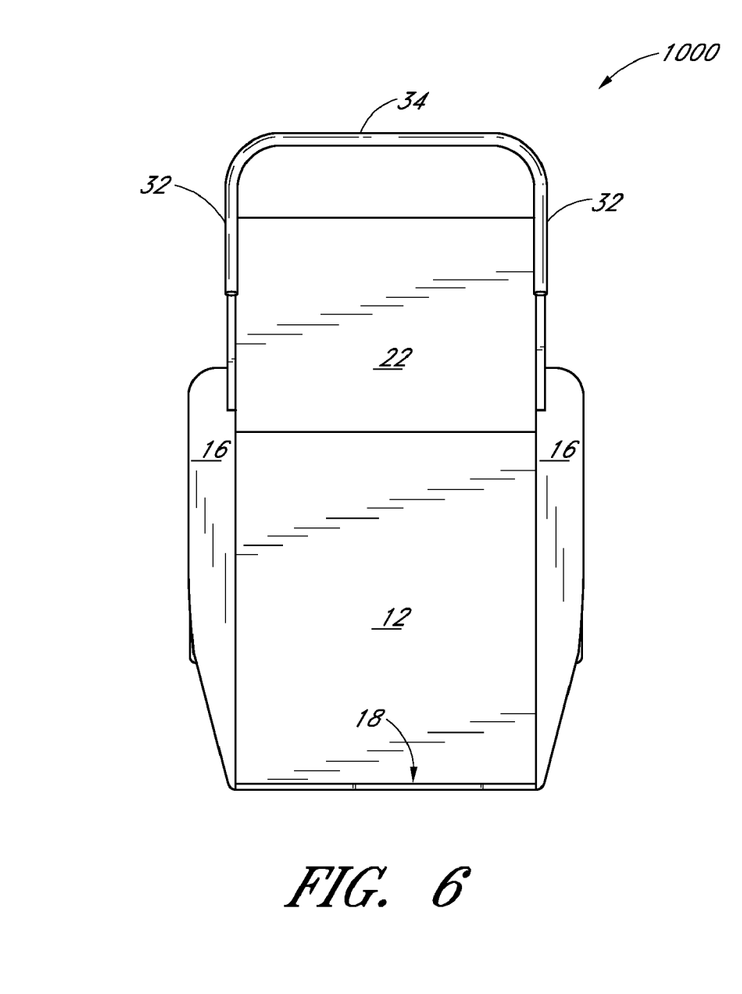
FIG. 6 is a schematic top view of the three-wheeled cart of FIG. 1.
Figure 7:
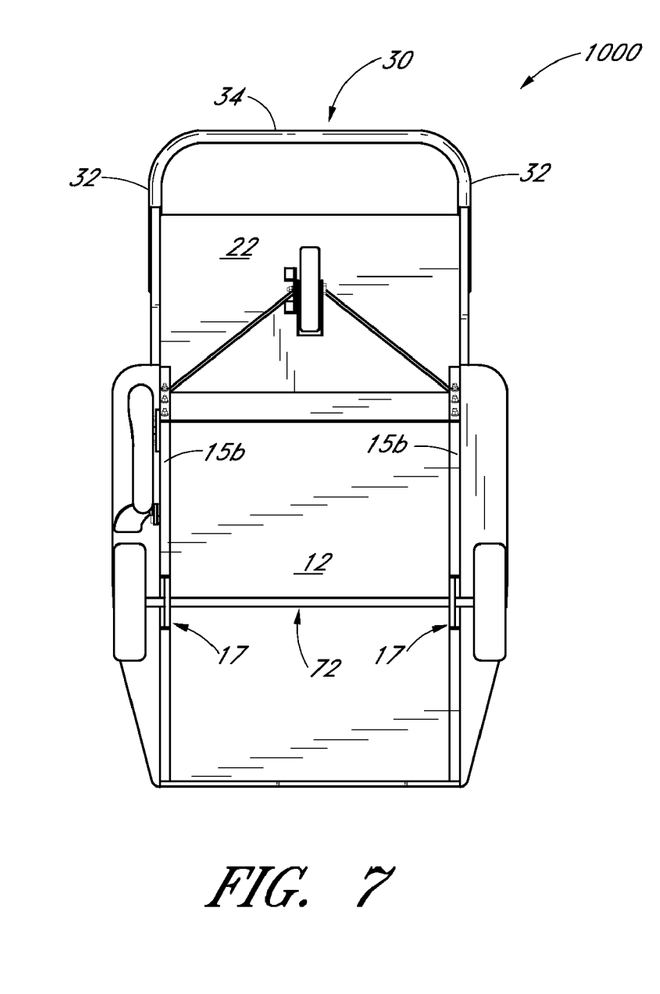
FIG. 7 is a schematic bottom view of the three-wheeled cart of FIG. 1

As best seen in FIG. 6, the fenders 16 can taper outward from the front end 2 of the TW cart 1000. In one embodiment, the fenders 16 can taper along their entire length. In another embodiment, the fenders 16 can taper along a portion of their length. In one embodiment, the fenders 16 can be wedge-shaped. However, the fenders 16 can have other suitable shapes. In one embodiment, the fenders 16 can have a maximum width of between about one inch and about 6 inches, more preferably about 4 inches.

With reference to FIG. 4, in one embodiment the side walls 14 can have a triangular shape. However, in other embodiments, the side walls 14 can have other suitable shapes, such as rectangular.

The TW cart 1000 also preferably includes a back portion 20 attached to the bottom portion 10. The back portion 20 can include a back plate 22 and a pair of side rails 24 attached to opposite sides of the back plate 22 so as to define a recess 23 therebetween. In one embodiment, the side rails 24 can be square tubing. For example, in one embodiment, the side rails 24 can be square tubing having a 1"×3" cross-section size.

In the illustrated embodiment, the back plate 22 is generally planar. In another embodiment, the back plate 22 can have a concave shape in transverse cross-section. However, the back plate 22 can have other suitable shapes. The back plate 22 is preferably inclined rearwardly toward the rear end 4 of the TW cart 1000, which advantageously maintains the stability of the cart irrespective of the load amount carried by the cart.

The TW cart 1000 preferably includes a handle 30 attached to proximal ends of the side rails 24. In the illustrated embodiment, the handle 30 is c-shaped and includes a pair of side members 32 attached to the corresponding side rails 24 and a support portion 34 attached to the side members 32 and disposed rearwardly of the back plate 22. The support portion 34 of the handle preferably provides ergonomic support to a user's hands during operation of the TW cart 1000. In one embodiment, the handle 30 can be 1 inch diameter 11 gauges tubing. However, the handle 30 can have other suitable dimensions. The handle 30 can be hollow and the ends of the side members 32 can be generally closed (e.g., via caps) to prevent insertion of outside matter into the handle 30. In one embodiment, the handle 30 can have a height of between about 25 inches and 45 inches, and more preferably about 39 inches from the ground. However, the handle 30 can be disposed at other suitable distances from the ground.

With reference to FIG. 1, the TW cart 1000 can include a rear support 50 attached to the bottom portion 10 and back portion 20 of the TW cart 1000. The rear support 50 can include a platform portion 52 and a pair of side portions 54 attached to the platform portion 52. In one embodiment, the rear support 50 can be coupled to the bottom portion 10 via fasteners 60 extending through fastener openings in the side portions 54. In the illustrated embodiment, the fasteners 60 are bolts and corresponding nuts. However, in other embodiments the fasteners 60 can be other suitable fasteners, such as pins, screws, rivets, clamps, etc.

The TW cart 1000 can also include a pair of front wheels 70 coupled to each other via an axle 72 that is rotatably mounted on axle mounts 17 (see FIG. 7) of the bottom portion 10. The front wheels 70 can include tires 70a thereon and are preferably disposed below and inwardly of an outer edge of the fenders 16. Accordingly, when the TW cart 1000 is viewed from the top (FIG. 6), the fenders 16 preferably cover the wheels 70. In one embodiment, the front wheels 70 are 10 inch diameter wheels that, in one embodiment, can include a pneumatic in each tire 70a.

With reference to FIG. 1, the TW cart 1000 can also include a rear wheel 80 with a rear tire 80a operatively couple to the platform portion 52 of the rear support 50. In a preferred embodiment, the rear wheel 80 is pivotably coupled to the platform portion 52, allowing the rear wheel 80 to pivot 360 degrees around a vertical axis. In another embodiment, the rear wheel 80 can be pivotably coupled to the platform portion 52 so as to be pivotable over a range of less than 360 degrees.

A rear brake mechanism 90 is preferably coupled to the rear wheel 80. In one embodiment, the rear brake mechanism 90 can be a cam brake mechanism. However, in other embodiments, the rear brake mechanism 90 can be other suitable brake mechanisms, such as other mechanical brake mechanisms. In the illustrated embodiment, the rear brake mechanism 90 includes a cam lever 92 coupled to a brake member 94 and pivotably coupled to the axle of the rear wheel 80. The brake member 94 can be actuated, via the pivoting of the cam lever 92, into and out of engagement with the rear tire 80a to engage or disengage the rear brake 80 and thereby inhibit the rotation of the rear wheel 80. In the illustrated embodiment, the brake member 94 is coupled to the axle of the rear wheel 80 on both sides of the wheel 80.

The TW cart 1000 can also have a front brake mechanism 100 attached to the bottom portion 10 and operable to engage the tire 70a of one of the front wheels 70 to inhibit the rotation thereof In the illustrated embodiment, the front brake mechanism 100 can include a cam actuator pedal 102 pivotably coupled to the side wall 4 of the bottom portion 10 via a pedal pivot 104. In one embodiment, the cam actuator pedal 102 can be pivotable between 30 and 45 degrees. However, in other embodiments, the cam actuator pedal 102 can be pivotable more than 45 degrees or less the 30 degrees. The cam actuator pedal 102 includes a proximal portion 102a and a distal portion 102b. In the illustrated embodiment, the front brake mechanism 100 also includes a brake pad or member 106 pivotably coupled to the side wall 14 via a brake pad pivot 108. The cam actuator pedal 102 is coupled the brake pad 106 via a brake pad adjusting member 110. The brake pad adjusting member 110 advantageously transmits rotation of the cam actuator pedal 102 into pivoting of the brake pad 106. Additionally, the brake pad adjusting member 110 can be used to adjust the distance between the brake pad 106 and the front tire 70a to vary the amount of force applied by the brake pad 106 to the front tire 70a when the cam actuator pedal 102 is actuated to move the brake pad 106 into engagement with the front tire 70a.

During operation, the user can push the TW cart 1000 to maneuver the cart 1000 to a desired location. The pivoting rear wheel 80 advantageously allows the TW cart 1000 to turn in tight spaces. Additionally, when a side of the cart 1000 collides with an object (e.g., doorway or entryway), the fenders 16 advantageously guide the TW cart 1000 away from the object and inhibit a jarring collision that may be jarring to a user's hands. Also, the fenders 16 allow a user to place a load on the cart 1000 (e.g., hoses), without the load coming in contact with the front wheels 70 and obstructing the rotation thereof and while maintaining the stability of the TW cart 1000 irrespective of the load amount carried by the cart 1000. Further, during operation of the TW cart 1000, the user can support his or her hands on the support portion 34 of the handle 30, thereby inhibiting contact with any object (e.g., doorway) that strikes the side members 32 of the handle 30. The TW cart 1000 can advantageously support about 1000 lbs of weight. In another embodiment, the TW cart 1000 can support about 1200 lbs of weight. In still another embodiment, the TW cart 1000 can support about 1300 lbs of weight. However, in other embodiments, the TW cart 1000 can have a sufficient strength and rigidity to support more than 1300 lbs.

When the TW cart 1000 is at a standstill, the user can engage one or both of the rear and front brake mechanisms 90, 100. In one embodiment, the brake mechanisms 90, 100 are parking brakes. As discussed above, the rear brake mechanism 90 is actuated by pivoting the cam member 92 to engage the brake member 94 with the rear tire 80a, which advantageously inhibits the rotation and pivoting of the rear wheel 80. A user can disengage the brake member 94 from the rear tire 80a by pivoting the cam member 92 in the opposite direction.

To engage the front brake mechanism 100, the user can depress the proximal portion 102a of the cam actuator pedal 102 to pivot the petal 102 to translate the brake pad adjusting member 110 toward the front wheel 70. Said translation of the brake pad adjusting member 110 pivots the brake pad 106 into engagement with the front tire 70a. To disengage the brake pad 106 from engagement with the front tire 70a, the user can depress the distal portion 102b of the cam actuator pedal 102, causing the brake pad adjusting member 110 to translate away from the front wheels 70, which in turn causes the brake pad 106 to pivot out of engagement with the front tire 70a.

Figure 8:
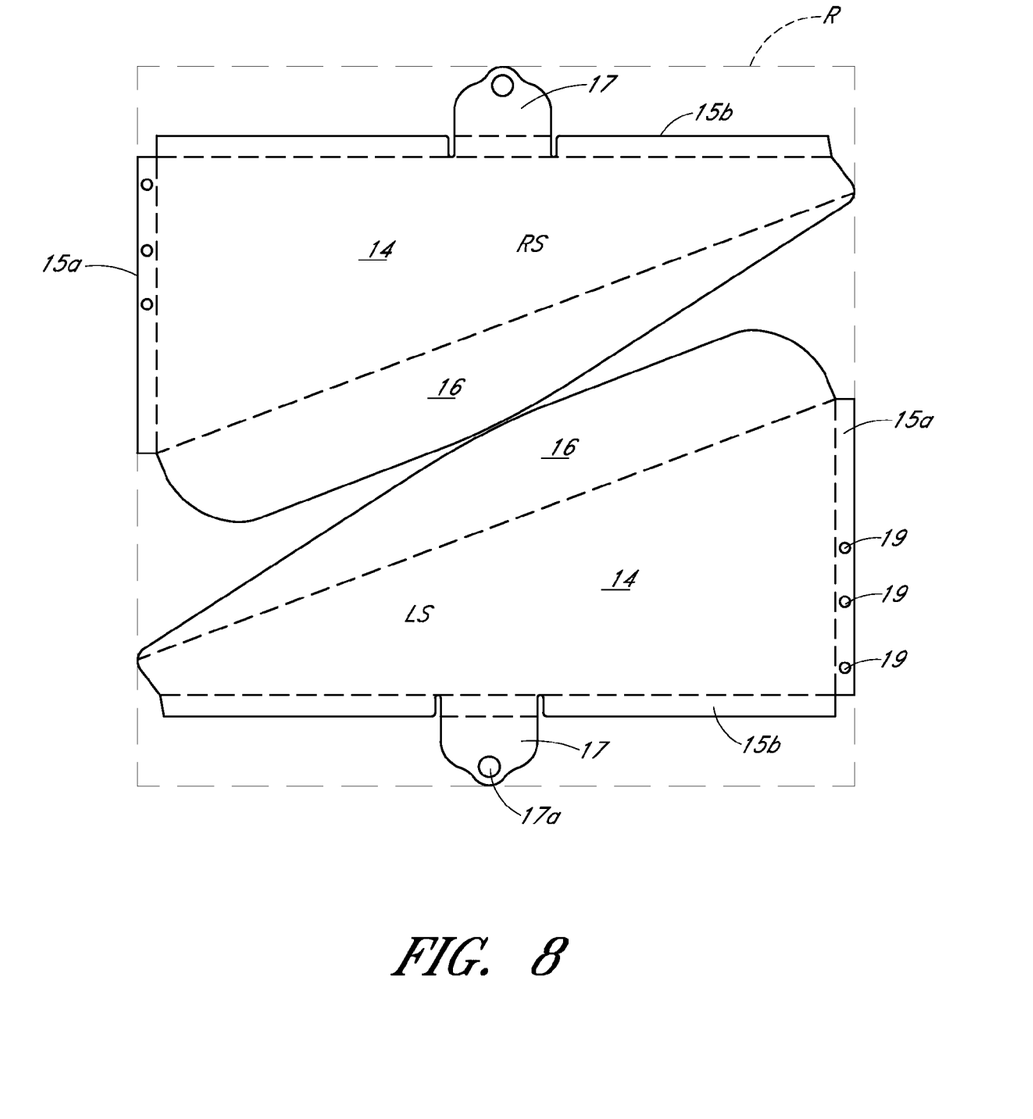
FIG. 8 is a schematic plan view of one embodiment of components of the three-wheeled cart frame.

In one embodiment, each side wall 14, fender 16 and axle mount 17 can be part of one piece, which facilitates the manufacturing process and increases the rigidity and strength of the TW cart 1000. FIG. 8 shows one embodiment of a start plate R (in phantom) from which the left and right sides LS, RS of the TW cart 1000 can be obtained. In one embodiment, the start plate R can be a 3/16 inch thick hot rolled steel plate. However, the start plate R can have other dimensions or be of other suitable materials. In the illustrated embodiment, the left plate LS can be cut out (e.g., laser cut) of the start plate R and has a contour that corresponds to the shape of the side wall 14, fender 16 and axle mount 17. The left plate LS can be bent, e.g., with a press brake) along the dotted lines to position the side wall 14, fender 16 and axle mount 17 as desired for the construction of the bottom portion 10 of the TW cart 1000.

As seen in FIG. 8, the axle mount 17 can include an axle mount opening 17a that can receive the front axle 72 therethrough to support the axle 72 relative to the bottom portion 10 of the TW cart 1000. Additionally, the left plate LS can have a rear edge 15 with several fastener openings 19 therein. The rear edge 15 can be bent about the dotted line and placed in contact with the back plate 22 during assembly of the cart 1000. Additionally, the fastener openings 19 can receive the fasteners 60 therethrough to couple the bottom portion to the back plate and/or side rails 24. The right plate RS can be similarly shaped to provide the right side of the TW cart 1000. Advantageously, use of the left and right plates LS and RS facilitate the manufacturing process and reduces cost of production, as well as ensures the correct axle location, so that the front tires 70 will advantageously be set parallel to the side walls 14 of the TW cart 1000 and inhibit the pulling of the cart 1000 in one direction (e.g., due to the misalignment of the axle 72.

The left and right plates LS, RS also include bottom edges 15b that can be bent along the dotted line. Once the left and right sides of the cart have been shaped as desired, the base plate 12 can be disposed between the left and right sides and attached thereto (e.g., welded, bolted). Similarly, the side rails 24 can be fastened (e.g., welded) to the back plate 22, after which the back portion 20 can be fastened to the bottom portion 10 with the fasteners 60, which can extend through the openings a 19 in the rear edge 15a, the back plate 22 and/or side rails 24.

Figure 9:
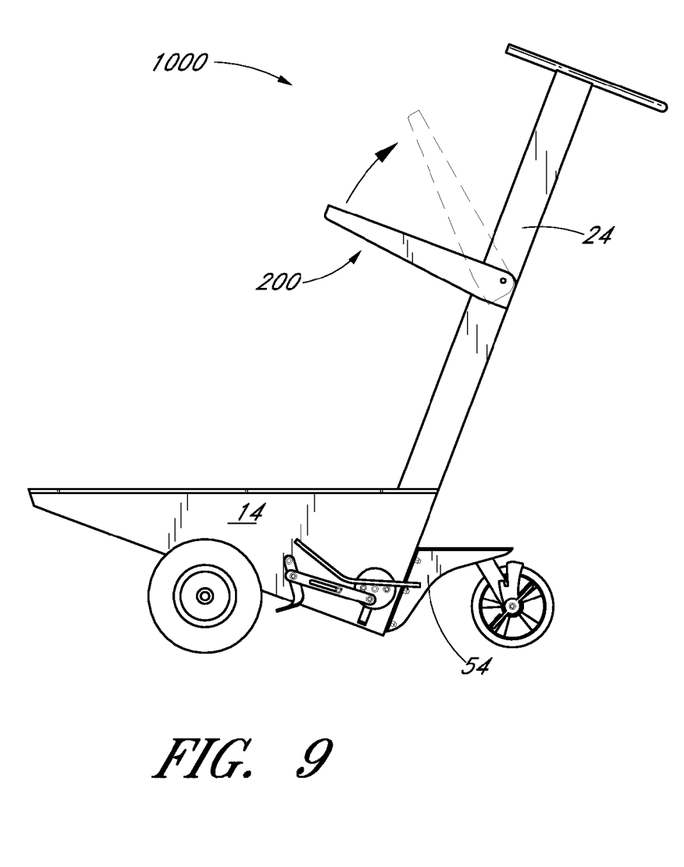
FIG. 9 is a schematic left view of another embodiment of a three-wheeled cart.

FIG. 9 shows another embodiment of a three-wheeled (TW) cart 1000'. The three-wheeled cart 1000' is similar to the TW cart 1000, except as noted below. Thus, the reference numerals used to designate the various components of the TW cart 1000' are identical to those used for identifying the corresponding components of the TW cart in FIGS. 1-8, except that a "'" has been added to the reference numerals. In the illustrated embodiment, the TW cart 1000' includes a foldable shelf 200 that can be pivotably mounted to the side rails 24' of the TW cart 1000' and can support an additional load. In one embodiment, the foldable shelf 200 can have a length of between about 6 inches and about 24 inches, and more preferably about 15 inches. However, the shelf 200 can have other suitable lengths. In one embodiment, the shelf 200 can be formed form the same material as the back plate 22' or base plate 12'. However, in another embodiment, the shelf 200 can be formed from any suitable material.

Of course, the foregoing description is that of certain features, aspects and advantages of the present invention, to which various changes and modifications can be made without departing from the spirit and scope of the present invention. Moreover, the TW cart need not feature all of the objects, advantages, features and aspects discussed above. Thus, for example, those of ordinary skill in the art will recognize that the invention can be embodied or carried out in a manner that achieves or optimizes one advantage or a group of advantages as taught herein without necessarily achieving other objects or advantages as may be taught or suggested herein. In addition, while a number of variations of the invention have been shown and described in detail, other modifications and methods of use, which are within the scope of this invention, will be readily apparent to those of skill in the art based upon this disclosure. It is contemplated that various combinations or subcombinations of these specific features and aspects of embodiments may be made and still fall within the scope of the invention. Accordingly, it should be understood that various features and aspects of the disclosed embodiments can be combined with or substituted for one another in order to form varying embodiments of the TW cart.

What is claimed is:

1. A three-wheeled cart, comprising:
  a bottom portion configured to support a load thereon, the bottom portion comprising a plate-like base inclined downwardly toward a rear end of the cart and extending along a length from a proximal end to a distal end of the base, a pair of substantially triangular plate-like side walls attached to the base, the base and side walls defining a cavity therebetween, the bottom portion further comprising a pair of planar fenders extending outwardly from the side walls, the fenders having a width that tapers toward a front end of the cart and is configured to deflect the cart away from an object even in a head-on collision between the object and the fenders, the bottom portion further comprising a pair of axle mounts extending below the base;
  a pair of front wheels coupled to each other via an axle rotatably mounted on the axle mounts so that the axle is disposed directly beneath a bottom surface of the base between said mounts, the front wheels disposed below the fenders and inwardly therefrom;
  a positive cam brake coupled to one of the plate-like side walls, the cam brake mechanically actuatable to engage at least one of the pair of front wheels to lock said wheel;
  a planar back portion attached to the bottom portion, the back portion comprising a back plate inclined rearwardly toward the rear end of the cart and extending along a length from a proximal end to a distal end of the back portion that is greater than the length of the base, the distal end of the back portion attached to the proximal end of the plate-like base at a junction that is disposed below a horizontal plane extending through the axle of the front wheels, said junction defining a lowest-most point of the cart between the front wheels and a rear wheel of the cart, in order to maintain the stability of the cart during use irrespective of a load amount disposed in or on the cart, the back portion further comprising a pair of side rails attached to the back plate;
  a c-shaped handle portion attached to the side rails and having a support portion disposed rearward of the back plate, the support portion configured to support a user's hands while pushing the cart while protecting the user's hands from colliding with an object that comes in contact with a side of the cart during use; and
  the rear wheel operatively coupled to the bottom portion and disposed rearwardly of the side walls of the bottom portion, the proximal end of the back portion disposed rearwardly of the rear wheel, the rear wheel configured to pivot about a vertical axis to facilitate the turning of the cart,
  wherein the cart is configured to support a load of at least 1000 lbs.

2. The three-wheeled cart of claim 1, wherein each sidewall, fender and axle mount of the bottom portion is one piece.

3. The three-wheeled cart of claim 1, wherein one or both of the bottom and back portions comprise a 3/16 inch thick hot rolled metal plate, the cart configured to support about 1000 lbs of load.

4. The three-wheeled cart of claim 1, further comprising a mechanical cam brake coupled to the rear wheel and selectively operable to lock the rear wheel, the cam brake comprising a brake pedal pivotable about an axis of rotation of the rear wheel, the brake pedal coupled to a rotatable cam in turn coupled to a brake member configured to engage a tire of the rear wheel when the cam brake is actuated to engage the brake.

5. The three-wheeled cart of claim 1, wherein the positive cam brake actuatable to engage at least one of the front wheels comprises a brake pad configured to engage a tire of said at least front wheel and a brake pad adjusting member extending between the brake pad and brake pedal, the brake pad adjusting member selectively actuatable to vary the distance between the brake pad and the tire when the brake is in a disengaged state so as to vary a brake force applied to the tire when the brake pedal is actuated by a user to engage the brake.

6. The three-wheeled cart of claim 5, wherein the cam is coupled to the brake pedal and brake pad adjusting member and rotatable about an axis, and wherein the cam is configured to rotate when brake pedal is actuated by a user, said rotation of the cam causing a translation of the brake pad adjusting member toward the brake pad to pivot the brake pad about an axis into engagement with the tire.

7. The three-wheeled cart of claim 1, wherein the axle of the front wheels is mounted on at least two axle mounts defined by cut-out portions on the bottom portion that are bent away from the bottom portion to extend generally perpendicular to the bottom portion.

8. The three-wheeled cart of claim 1, wherein the rear wheel is pivotably mounted on a rear support structure coupled to the bottom portion and back portion.

9. The three-wheeled cart of claim 1, wherein one or more of the bottom portion and back portion is configured to support cables used at movie and television studio sets to connect power and/or control lighting.

10. A three-wheeled cart, comprising:
  a bottom portion comprising a plate-like base inclined downwardly toward a rear end of the cart and extending along a length from a proximal end to a distal end of the base, a pair of substantially triangular plate-like side walls attached to the base, the base and side walls defining a cavity therebetween, the bottom portion further comprising a pair of plate-like wedge-shaped fenders extending outwardly from the side walls, the fenders having a width that tapers toward a front end of the cart and is configured to deflect the cart away from an object even in a head-on collision between the object and the fenders, and a pair of axle mounts attached to the side walls and extending below the base, each side wall, fender and axle mount being integral with each other and part of a single monolithic piece;
  a pair of front wheels coupled via an axle rotatably mounted to the axle mounts so that the axle is disposed directly beneath a bottom surface of the base between said mounts, the front wheels disposed below the fenders and inwardly therefrom;
  a mechanical brake coupled to one of the plate-like side walls, the brake actuatable to engage one of the front wheels to inhibit rotation of said wheel;
  a planar back portion attached to the bottom portion, the back portion comprising a back plate inclined rearwardly toward the rear end of the cart and extending along a length from a proximal end to a distal end of the back portion that is greater than the length of the base, the distal end of the back portion attached to the proximal end of the plate-like base at a junction that is disposed below a horizontal plane extending through the axle of the front wheels, said junction defining a lowestmost point of the cart between the front wheels and a rear wheel of the cart, in order to maintain the stability of the cart during use irrespective of a load amount carried by the cart;

a handle portion attached to a pair of side rails attached to the back plate and having a support portion disposed rearwardly of the back plate, the support portion configured to support a user's hands during operation of the cart while protecting the user's hands from colliding with an object that comes in contact with a side of the cart during use; and the rear wheel operatively coupled to the bottom portion and disposed rearwardly of the bottom portion, the rear wheel configured to pivot about a vertical axis to facilitate the turning of the cart, wherein the cart is configured to support a load of at least 1000 lbs.

11. The three-wheeled cart of claim 10, wherein the side rails and back plate define a recess therebetween.

12. The three-wheeled cart of claim 10, further comprising a mechanical brake coupled to the rear wheel that comprises a cam brake selectively operable to inhibit rotation of the rear wheel, the cam brake comprising a brake pedal pivotable about an axis of rotation of the rear wheel, the brake pedal coupled to a rotatable cam in turn coupled to a brake member configured to engage a tire of the rear wheel when the cam brake is actuated to engage the brake.

13. The three-wheeled cart of claim 10, wherein the handle portion is c-shaped.

14. The three-wheeled cart of claim 10, wherein the mechanical brake coupled to one of the front wheels comprises a positive cam brake comprising a brake pad configured to engage a tire of said front wheel and a brake pad adjusting member extending between the brake pad and brake pedal, the brake pad adjusting member selectively actuatable to vary the distance between the brake pad and the tire when the brake is in a disengaged state so as to vary a brake force applied to the tire when the brake pedal is actuated by a user to engage the brake.

15. The three-wheeled cart of claim 14, wherein the cam is coupled to the brake pedal and brake pad adjusting member and rotatable about an axis, and wherein the cam is configured to rotate when brake pedal is actuated by a user, said rotation of the cam causing a translation of the brake pad adjusting member toward the brake pad to pivot the brake pad about an axis into engagement with the tire 16. The three-wheeled cart of claim 10, wherein the rear wheel is pivotably mounted on a rear support structure coupled to the bottom portion and back portion.

17. The three-wheeled cart of claim 10, wherein one or more of the bottom portion and back portion is configured to support cables used at movie and television studio sets to connect power and/or control lighting.

18. A three-wheeled cart, comprising:

a bottom portion comprising a plate-like base inclined downwardly toward a rear end of the cart and extending along a length from a proximal end to a distal end of the base, a pair of substantially triangular plate-like side walls attached to the base, the base and side walls defining a cavity therebetween, the bottom portion further comprising a pair of planar fenders extending outwardly from the side walls, the fenders having a width that tapers toward a front end of the cart and is configured to deflect the cart away from an object even in a head-on collision between the object and the fenders, the bottom portion further comprising a pair of axle mounts attached to the side walls and extending below the base, each side wall, fender and axle mount being integral with each other and part of a single monolithic piece;

the axle mounts configured to receive a pair of front wheels coupled via an axle rotatably mounted to the axle mounts so that the axle is disposed directly beneath a bottom surface of the base between said mounts, the front wheels disposed below the fenders and inwardly therefrom;

a mechanical brake coupled to the bottom portion, the brake actuatable to engage at least one of the front wheels to inhibit rotation of said wheel;

a planar back portion attached to the bottom portion, the back portion comprising a back plate inclined rearwardly toward the rear end of the cart and extending along a length from a proximal end to a distal end of the back portion that is greater than the length of the base, the distal end of the back portion attached to the proximal end of the plate-like base at a junction that is disposed below a horizontal plane extending through the axle of the front wheels, said junction defining a lowestmost point of the cart between the front wheels and a rear wheel of the cart, in order to maintain the stability of the cart during use;

a handle portion attached to a pair of side rails and having a support portion disposed rearwardly of the back plate, the support portion configured to support a user's hands during operation of the cart while protecting the user's hands from colliding with an object that comes in contact with a side of the cart during use; and a mount configured to operatively couple the rear wheel to the bottom portion and to position the rear wheel rearwardly of the bottom portion, the rear wheel configured to pivot about a substantially vertical axis to facilitate the turning of the cart, wherein the cart is configured to support a load of at least 1000 lbs.

19. The three-wheeled cart of claim 18, wherein the side rails and back plate define a recess therebetween.

20. The three-wheeled cart of claim 18, further comprising a mechanical brake coupled to the rear wheel that comprises a cam brake selectively operable to inhibit rotation of the rear wheel, the cam brake comprising a brake pedal pivotable about an axis of rotation of the rear wheel, the brake pedal coupled to a rotatable cam in turn coupled to a brake member configured to engage a tire of the rear wheel when the cam brake is actuated to engage the brake.

21. The three-wheeled cart of claim 18, wherein the handle portion is c-shaped.

22. The three-wheeled cart of claim 18, wherein the mechanical brake coupled to at least one of the front wheels comprises a positive cam brake comprising a brake pad configured to engage a tire of said least one of the front wheels and a brake pad adjusting member extending between the brake pad and brake pedal, the brake pad adjusting member selectively actuatable to vary the distance between the brake pad and the tire when the brake is in a disengaged state so as to vary a brake force applied to the tire when the brake pedal is actuated by a user to engage the brake.

23. The three-wheeled cart of claim 22, wherein the cam is coupled to the brake pedal and brake pad adjusting member and rotatable about an axis, and wherein the cam is configured to rotate when brake pedal is actuated by a user, said rotation of the cam causing a translation of the brake pad adjusting member toward the brake pad to pivot the brake pad about an axis into engagement with the tire.

24. The three-wheeled cart of claim 18, wherein the rear wheel is pivotably mounted on a rear support structure coupled to the bottom portion and back portion.

25. The three-wheeled cart of claim 18, wherein one or more of the bottom portion and back portion is configured to support cables used at movie and television studio sets to connect power and/or control lighting.

* * * * *